United States Patent Office

3,523,723
Patented Aug. 11, 1970

3,523,723
NONINTERMITTENT MOTION PICTURE FILM CAMERAS AND PROJECTORS
Joseph H. Lancor, Jr., Arcadia, Calif., assignor to Bell & Howell Company, Chicago, Ill., a corporation of Illinois
Filed Aug. 22, 1967, Ser. No. 662,343
Int. Cl. G03b 41/10
U.S. Cl. 352—112                          25 Claims

ABSTRACT OF THE DISCLOSURE

An apparatus for controlling the relative position of images which has a mechanism for individually advancing, individually returning and translatorily shuttling at least two image-deflecting devices. This mechanism decreases the rate of return of each image-deflecting device in a controlled manner and correlates the travel of the translatory shuttling motion to the decreased rate of return.

BACKGROUND OF THE INVENTION

Field of the invention

The subject invention relates to optical apparatus and, more particularly, to continuous or nonintermittent motion picture film projectors and cameras.

Description of the prior art

The desire to project motion pictures from continuously moving film or to photograph motion picture scenes on continuously moving film is probably as old as the motion picture art itself. This desire is well justified by the many advantages its realization would yield. Continuous film motion, as distinguished from intermittent frame-by-frame movement, subjects the film to considerably less strain, facilitates the recording and the reproduction of sound accompaniments and, ideally, provides a flicker-free performance.

To date, a multitude of continuous film-motion cameras and projectors has been proposed. One species of these proposals is characterized by the use of continuously moving systems of optical means, such as lenses, prisms, glass plates or mirrors compensating sequentially for the continuous film motion. The primary disadvantage of these systems resides in the presence of comparatively large rotating bodies which have to be synchronized as against their considerable inherent inertia, which necessitate an increase in size of the projector and which introduce considerable expenses. Machines of this type are thus mainly intended for use in expensive television scanning systems or elaborate slow-motion cameras.

As an alternative, it has been proposed to move the compensating optical means along constricted endless paths. However, this requires special guides and highly precise means for moving the compensating elements along these guides.

Another species of the prior-art proposals is characterized by the use of a rapidly reciprocated glass plate, prism or mirror. As a rule, systems of this type cannot conveniently eliminate interframe flicker and require an extremely fast flyback of the motion compensating element between each pair of adjacent image frames.

According to an early proposal, interframe flicker is countered by the use of two prisms which are located side-by-side and which are individually moved up and down in parallel to the plane of the images to be projected, so as to operate sequentially on adjacent image frames. The most severe drawback of this proposal, which is disclosed in U.S. Pat. 1,309,672, by W. B. Wescott, issued July 15, 1919, resides in the fact that it either entails a nonsequential arrangement of image frames on the film (see Wescott FIG. 19) or that it requires the provision of two separate light paths resulting in a duplication of optical systems with consequent parallax errors (see Wescott FIGS. 15, 16, 21, 22 and 24 to 27). Another disadvantage of the Wescott structure resides in the need of special shutter means.

A more advanced proposal counters interframe flicker by the use of two mirrors which are individually tilted from an initial angular position to an advanced angular position, and which are jointly shuttled so as to be placed alternatively in the optical path of the projector for the compensation of the continuous film motion. (See Pat. 2,305,838, Palle-Finn Beer, issued Dec. 22, 1942.) Despite the advanced nature of that proposal, the market is still dominated by the familiar kind of intermittent motion picture projector, to the practical exclusion of continuous film motion systems, at least in the home and aircraft passenger entertainment areas, in the educational film display field, and in the motion picture theatre art.

The reason therefor resides principally in the fact that the proposal just outlined materializes itself in a system that is characterized by considerable wear of vital parts of the mirror moving mechanism and by the emission of disturbing noises that tend to surpass even those produced by intermittent-type projectors. Quite apart from matters of design, this unsatisfactory performance is predicated on the avowed necessity inherent in that proposal of carrying out the return of each mirror from an angular advanced to an angular initial position in an instantaneous fashion, checked only by the inherent inertia, friction and air resistance of the particular mirror and the angularly movable parts of its mounting and forward-actuation structure, and by possible limitations on the power of the return springs.

As a consequence, more recent two-mirror proposals employ rotating light director means and auxiliary reflecting surfaces to permit a more deliberate rate of mirror return. (See Pat. 2,770,163, Mattke, issued Nov. 13, 1956.) This additional equipment negates, of course, the advantages of a comparatively simple two-mirror arrangement to a considerable extent, by imposing additional optical losses and complicating mechanisms.

SUMMARY OF THE INVENTION

The subject invention provides apparatus for controlling the relative position of images which overcome the above mentioned disadvantages.

From one aspect of the invention, these apparatus comprise means including at least two devices for deflecting image-bearing radiations, means for individually moving each of these devices from a first deflecting position to a second deflecting position, means for individually returning each device from its second position to its first position, and means for sequentially positioning these devices in the path of image-bearing radiations by imposing on the devices a reciprocating translatory motion.

According to the invention, the movement of the devices from the mentioned first position to the second position proceeds at a first rate, and the named return from the second position to the first position is made to proceed at a second rate, with the ratio of the first rate to the second rate being greater than zero but less than one, and with the amplitude of the travel of said translatory motion being correlated to this ratio.

As this description proceeds, it will be recognized that the features just described provide image handling equipment, such as nonintermittent motion picture cameras, or projectors, which carry out a continuous performance without excessive noise, wear and tear of mechanical parts.

From another aspect thereof, the invention provides a nonintermittent projector using two individually tilted and jointly shuttled mirrors for compensating for a continuous film motion. This projector is broadly characterized by the following interacting criteria:

(1) Each mirror is returned from an advanced angular position to an initial angular position preparatory to a subsequent compensatory action at an operatively controlled rate of return. This controlled rate is lower than the rate of return imposed by inertia, friction and air resistance phenomena inherent in the particular mirror and its angularly movable mounting and forward-actuation structure;

(2) The shuttling or reciprocal travel of each mirror is extended by amounts correlated to the controlled rate of mirror return mentioned under (1); and (3) Each mirror has a mirror surface which is laterally extended at least by an amount of width correlated to the controlled rate of mirror return mentioned under (1) and the amounts of extended mirror travel mentioned under (2).

The projector just described provides for a continuous-type mirror operation characterized by comparatively low mechanical wear and tear and low operating sound, and by relatively simple parts.

From another aspect thereof, the subject invention also permits the projection of a full frame between each two complete frame changeover operations for a predetermined duration of time which is at least equal to the duration of one of these two changeover operations. This aspect of the invention accomplishes this mode of display by extending the reciprocal travel of the mirrors by amounts correlated to the named predetermined duration of time, and by providing the mirrors with mirror surfaces that are laterally extended by amounts of width correlated to the named predetermined duration of time and to the extended reciprocal travel.

In this manner, a significant portion of the projector performance can be made to reside in the display of a full frame with shorted frame changeovers occurring therebetween. As the extended lateral mirror travel and the correlated lateral mirror widths are increased, the frame changeover can be made to occupy a comparatively small portion of the display of two adjacent image frames.

The advantage of this feature will be particularly felt if he frame changeover with a particular projector machine should tend to manifest itself in certain imperfections in the image display that would be noticeable if the frame changeover would occupy a longer period of time.

As this description proceeds, it will be recognized that the devices herein called "mirrors" need not necessarily be mirrors as such, but that other light-reflecting elements, such as prisms, may be used instead.

BRIEF DESCRIPTION OF THE DRAWINGS

The invention will become more readily apparent from the following detailed description of preferred embodiments thereof, illustrated by way of example in the accompanying drawings, in which:

FIG. 3 is a side view along the lines 3—3 in FIG. 2 of a cam disc used in the mirror drive of FIG. 2.

DESCRIPTION OF THE PREFERRED EMBODIMENTS

Figure 1:
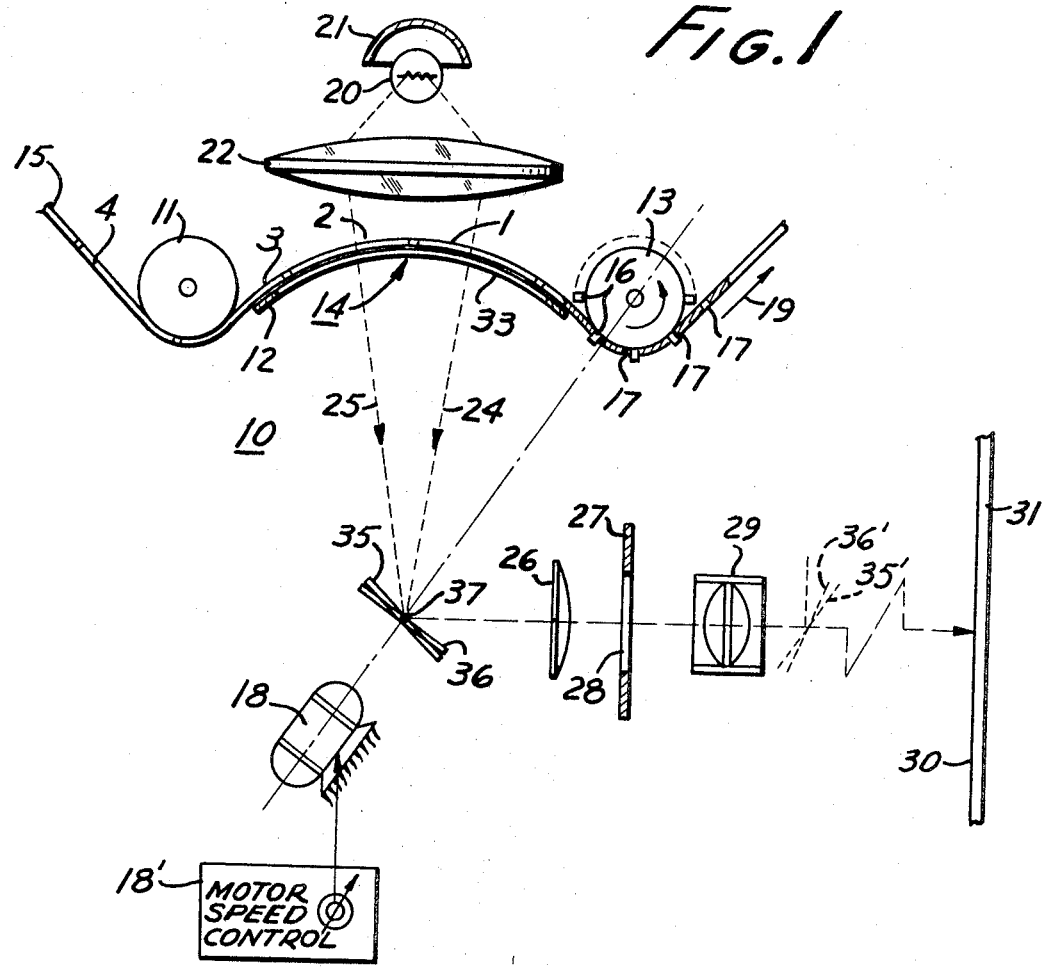
FIG. 1 is a schematical side view of a nonintermittent motion picture projector embodying principles of the subject invention.

The nonintermittent motion picture film projector 10 schematically shown in FIG. 1 includes means, namely an idling roller 11, a film gate 12 and a sprocket wheel 13 for continuously moving through a projection station 14 a motion picture film 15 bearing information, such as images relating to a scene to be displayed, in a series of image frames of which frames 1, 2, 3 and 4 are shown.

In a manner known per se, the sprocket wheel 13 has a series of sprockets 16 which engage sprocket holes 17 in the film 15. A drive 18 rotates the wheel 13 to cause continuous advancement of the film 15 in the direction of the arrow 19. The speed of the drive 18 is controlled by a variable motor speed control 18' in a manner known per se.

A projector lamp 20 with a reflector 21 and a condenser lens 22 constitutes a means for transmitting light through the projection station 14 and thus through image frames of the film 15. The resulting image-bearing luminous radiations 24 and 25 are processed by optical means, including here a lens 26, a mask 27 having an aperture 28, and an objective 29, for the formation of corresponding optical images on a projection surface 30. This surface 30 may be the surface of a projection screen 31. Alternatively, 31 may be a photosensitive film on which the images contained in frames of the film 15 are copied, or the light sensitive part of a video camera tube (not shown), which is to convert scenes shown on film 15 into corresponding electric video signal information for display in television networks or receiver equipment.

To prevent the showing of objectionably extended portions of adjacent image frames, the lens 26 portrays an image of these frames onto the mask 27 so that unwanted frame portions may be masked off.

The film gate 12 defines a window 33 that is large enough to permit the illumination of two adjacent image frames at a time. Also, the film gate 12 is curved in the illustrated embodiment to reduce image distortions (see Tuttle and Reid, The Problem of Motion Picture Projection From Continuously Moving Film, Journal Soc. Motion Picture Eng., Jan. 1933, p. 24).

A pair of mirrors 35 and 36 compensates for the continuous motion of the film 15. To this end, the mirrors 35 and 36 are pivotally movable about an axis 37 extending in parallel to a line which extends through the film 15 substantially at right angles to the direction of movement of the film 15. At the same time, the mirrors 35 and 36 are jointly shuttled or reciprocally moved in the direction of the axis 37. The expression "direction of the axis 37" is herein used to denote a movement back and forth along the axis 37 or at least along an axis parallel thereto.

The individual angular or pivotal movement of the mirrors 35 and 36 is effected so that these mirrors sequentially perform their compensatory action on alternate image frames. For instance, the mirror 35 compensates for the continuous movement of the odd-numbered frames 1, 3, et seq., while the mirror 36 compensates for the continuous movement of the even-numbered frames 2, 4, et seq. As is well known in the art, this compensatory action resides in tilting mirror movements which, as seen from the projection surface 30, give the impression that each image frame stands still for the duration of its projection.

Figure 2:
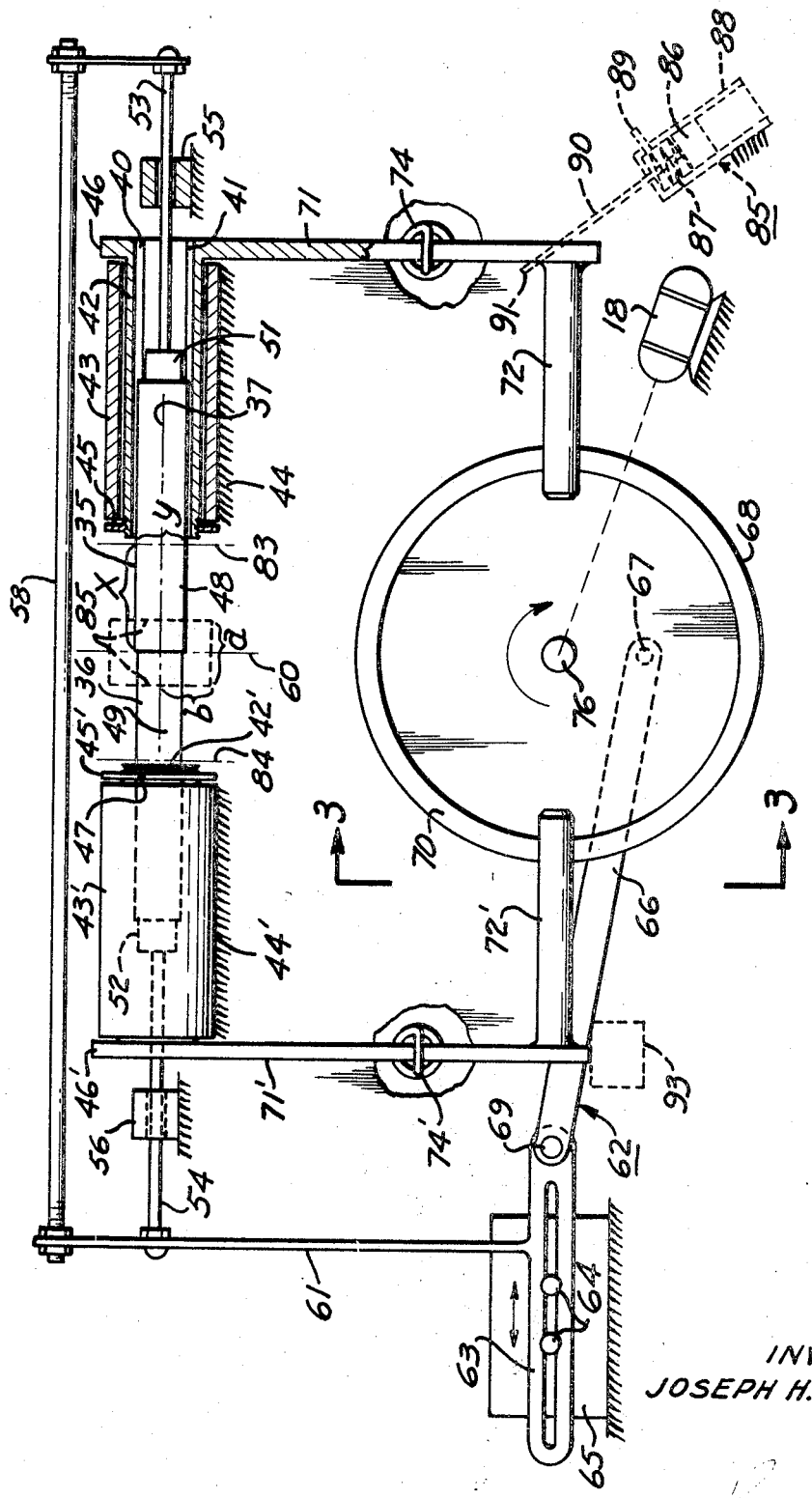
FIG. 2 is a front elevation of a mirror arrangement and mirror drive usable in the projector of FIG. 1.

An embodiment of a mirror arrangement and means for mounting and for driving the mirrors 35 and 36 is shown in FIG. 2. According to this figure, the mirror 35 is longitudinally slideable in grooves 40 and 41 of a sleeve or bushing 42. This bushing is angularly movable in a bearing 43 which is stationarily mounted as indicated at 44. An annulus 45 is threaded on the bushing 42 and cooperates with a bushing flange 46 in preventing axial movement of this bushing. Well-known means, such as a set screw 47, may be employed to retain the annulus 45 on the bushing 42.

The mirror 36 is mounted in a like manner for sliding longitudinal movement and angular or pivotal motion. To this end, a bushing 42' which corresponds to the bushing 42, a bearing 43' which corresponds to the bearing 43, an annulus 45' which corresponds to the annulus 45, and a bushing flange 46' which corresponds to the bushing flange 46 are provided, and the bearing 43' is stationarily mounted as indicated at 44'.

The bushings 42 and 42', their longitudinal guide slots, and the bearings 43 and 43' are provided so that the active surfaces 48 and 49 of the mirrors 35 and 36 lie in the previously mentioned axis 37 (see FIG. 1) at any position during the pivotal and the longitudinally reciprocal motion of the mirrors 35 and 36. Expressed in general terms, the mirrors 35 and 36 are mounted so that the axis 37 traverses the mirror surfaces 48 and 49 along lines which are common to these mirror surfaces and this axis.

This feature is of importance if a high quality of image display is desired.

The mirrors 35 and 36 are jointly shuttled or reciprocated along the axis 37 by a pair of members 51 and 52 which slide in the bushings 42 and 42' and which are driven by rods 53 and 54 that reciprocate in stationary bearings 55 and 56.

A tie rod 58 retains the members 51 and 52 in a correct mutual spacing, so that the mirrors 35 and 36 abut each other along a line 60. The arrangement just described is driven through a lever 61 by a mechanism 62 which translates rotational motion into reciprocal translatory motion.

To this end, the mechanism 62 has a grooved slide member 63 which is mounted for reciprocal translatory motion by a pair of pins 64 fastened to a stationary member 65. The mechanism 62 further includes a force transmission rod 66 which connects a pin 67 on a rotational body 68 to a pin 69 on the slide member 63. In this manner, the mirrors 35 and 36 are laterally shuttled upon rotation of the body 68.

To compensate for image frame motion, it is also necessary to tilt or angularly move the mirrors 35 and 36 about the axis. For this purpose, the bushing 42 carries a lever 71 and the bushing 42' carries a lever 71' as shown. The lever 71, in turn, has a lateral pin 72, while the lever 71' has a lateral pin 72'. A spring 74 biases the lever 71 so that the pin 72 is held against an axially rising outer rim 70 of the rotational body 68, while a spring 74' biases the lever 71' so that the pin 72' is held against the outer rim 70 of the rotational body 68 at a point which is diametrically opposed to the point at which the pin 72 contacts the rim 70. The previously mentioned drive 18 rotates the body 68 by means of a shaft 76 which is secured in a bearing (not shown).

As seen more clearly in FIG. 3, the outer rim 70 of the rotational body 70 defines a cam 77 for actuating the pins 72 and 72'. To realize the above mentioned operatively controlled rate of mirror return, this cam is gradually sloped, not only with respect to the cam portion (see 80) which provides for a pivotal forward movement of each mirror from an initial position to an advanced position during a compensatory action, but also with respect to the cam portion (see 81) that provides for a controlled return of each mirror from the advanced to the initial position at a rate of return that is lower than what matters of inherent inertia, friction, and air resistance of the assembly including mirror 35, sleeve 42, lever 71, and pin 72, and the power of the spring 74; or, correspondingly, of the assembly including mirror 36, sleeve 42', lever 71' and pin 72', and the power of the spring 74', would bring about.

While the rate of return of each mirror 35 and 36 is thus decreased, the mechanism 62 and the parts connected thereto reciprocate these mirrors by amounts of travel which, as indicated by the phantom lines 83 and 84, extend materially beyond the lateral outline 85 of the projection of the image gate window 33 onto the mirrors 35 and 36. These amounts of extended lateral travel are correlated to the decreased rate of mirror return. In addition, the lateral dimensions of the mirror surfaces 48 and 49 are augmented by amounts of widths that are correlated to the decreased rate of mirror return and to the extended amounts of lateral mirror travel.

This principle can best be understood from a consideration of a preferred mode of operation of the mirror arrangement shown in FIGS. 2 and 3 and thought incorporated into the projector of FIG. 1:

When the mirrors abut along the phantom line 60, the mirror 35 will have been tilted so that it compensates for the continuous motion of one of the image frames, while the mirror 36 will have been tilted so that it compensates for the continuous motion of an adjacent image frame. This compensatory action on two adjacent image frames continues by virtue of continued angular mirror movement until the abutting line 60 of the mirrors 35 and 36 has been moved beyond the left-hand confines of the outline 85. The compensatory action is thereupon carried out by the mirror 35 alone on one frame. Until the line of mirror abutment has moved to the phantom line 84 and has returned to the left-hand confines of the outline 85, the mirror 36 has time to return from its advanced angular position to its initial angular position at the decreased rate of return mentioned above. It may in practice not always be necessary to utilize all this time for the purpose of mirror return. If desired, the rate of return may be somewhat faster than that, but it should not be permitted to be as fast as to be in derogation of low noise and low wear and tear performance.

The compensatory action by the mirror 36 and the return of the mirror 35 proceeds in a fashion corresponding to that outlined for mirrors 35 and 36, respectively, in the preceding paragraph. In this manner, the travel and pivotal motion of the mirrors proceed without undue acceleration, noise, wear and tear of mechanical parts. Since the mirrors 35 and 36 are effective during frame changeover operations to compose a projected image by blending together adjacent frames, there is not interframe flicker in the image display. This improves the optical performance of the projector and makes it also suitable for use in film copying or television scanning system in which flicker phenomena bring about scanning problems. A material absence of flicker also permits motion picture projection at lower frame rates than would otherwise be possible, since the human eye is generally more sensitive to radical luminosity variations than to the motion of objects in a projected scene. Depending on the action in the filmed scenes, frame rates of twelve frames per second or less are possible, which results in a substantial saving of film material. In FIG. 1, the variable motor speed control 18' permits a variation, including a lowering of the film frame rate.

Various modifications of the illustrated structure are possible within the scope of the invention. For instance, the lateral travel of the mirrors and their lateral widths may be so dimensioned that a full image frame of the film is displayed between each two completed frame changeover operations for a predetermined time which is at least equal to the duration of one of these frame changeover operations. Stated generally, the mechanism 62 can be dimensioned so that the abutment line 60 between the mirrors 35 and 36 traverses the outline 85 quickly as compared to the travel time of this abutment line between the phantom lines 83 and 84 and 84 and 83, respectively. Possible optical distortions which a less than perfect frame changeover may tend to introduce will then go substantially unnoticed. In this mode of operation, the lateral amounts of mirror travel and of mirror widths may exceed the amounts required by given mirror return times.

Moreover, it will also be recognized that the invention provides apparatus of the type set forth herein in which the substantially rectangular light-deflecting area of each of the light-deflecting devices has an aspect ratio which is larger than the aspect ratio of the images to be projected or to be filmed. This is shown in FIG. 2 where the ratio of the indicated dimensions $a$ to $b$ substantially represents the aspect ratio of the rectangular image frames to be projected, while the ratio of the dimensions $x$ to $y$, indicated for the mirror 35 but equally applicable to the mirror 36, represents the aspect ratio of that area of each mirror surface which is effectively used in the motion-compensatory image-reflecting process.

According to the feature of the invention presently under consideration, the ratio of $x$ to $y$, being the aspect ratio of each effective mirror area, is larger than the ratio of $a$ to $b$; that is, larger than the aspect ratio of the image frames.

This enables the above mentioned faster frame changeover operations and also permits the above mentioned angular mirror return at a controlled or decreased rate.

In accordance with another modification, retarding means other than, or in addition to, slanted cam surfaces may be employed for decreasing the rate of mirror return. For instance, each of the levers 71 and 71' may be provided with a dashpot arrangement as shown in dotted outline 85 for the arm 71 in FIG. 2. That dashpot has a piston 86 which is biased by a spring 87 in a housing 88 which has an orifice 89 that impedes the rate of piston motion in a manner well known per se in the mechanical arts. The piston 86 has a piston rod 90 connected to the lever 71 at 91 and the dashpot thus decreases the rate of return of the mirror 35 even if the cam 77 should have a relatively abrupt cam surface. A like dashpot may be provided for the lever 71' to decrease the rate of return of the mirror 36.

Alternatively, an inertia weight or an air resistance vane may be attached to each of the levers 71 and 71'. One such weight or vane 93 is diagrammatically shown in dotted outline as attached to the arm 71' for retarding the rate of return of the mirror 36.

Slanted cam surfaces or similar means for controlling the rate of mirror return are, however, preferred for present purposes, since they permit a rate contol that is more readily variable as a function of film speed.

As to further modifications, it will be noted that FIG. 1 shows one drive 18 for actuating the mirrors 35 and 36 and the sprocket wheel 13, so as to provide for frame-correct synchronism between the film movement and the compensatory action therefor. Alternatively, it would also be possible to use a control loop which senses the progress of the film 15, such as by sensing sprocket holes or equivalent markings, and which controls the drive of the mirror motion means, such as the drive of the cam body 68, accordingly.

Moreover, while mechanical mirror actuation means have been shown in FIGS. 2 and 3, it would, of course, also be possible to employ electrical equivalents thereof, such as electrically controlled solenoids and torque actuators.

Also, the mirrors 35 and 36 need not necessarily be located between the film gate 12 and the objective 29, but may also be positioned ahead of the objective 29 as seen from the projection surface 30, and as indicated by dotted lines 35' and 36'. Position of the mirrors in the manner shown in FIG. 1 in solid lines is here preferred, since the mirrors are then better protected in the projector housing and since an improved optical performance tends to result if the mirrors are located closer to the projection station 14.

Furthermore, the devices 35 and 36 described above need not necessarily be angularly moved mirrors. For example, the pair of prisms disclosed in the above mentioned Wescott patent could be used as light-deflecting elements in lieu of the mirrors 35 and 36. In such a case, the prisms would be translatorily oscillated in repetitive sequence in a first direction while being at the same time jointly shuttled in a second direction so as to be sequentially placed into the path of the above mentioned image-bearing radiations. Preferably, the named first and second directions extend substantially at right angles to each other. In accordance with the teachings of the subject invention, each prism is returned to its initial deflecting position at the above mentioned controlled second rate and the reciprocal travel of the shuttling of the prisms in the mentioned second direction is extended to be correlated to such controlled second rate of return.

In addition, other above mentioned features according to the subject invention may also be applied to the prism arrangement just described.

All these modifications, as well as further alterations or improvements within the scope and spirit of the invention, are apparent or will suggest themselves to those skilled in the art.

I claim:

1. Apparatus for controlling the relative position of images, comprising:
    (a) means including at least two devices for deflecting image-bearing radiations;
    (b) means for individually moving each of said devices from a first deflecting position to a second deflecting position at a first rate;
    (c) means for individually returning each of said devices from said second position to said first position at a second rate, with the ratio of said first rate to said second rate being greater than zero but less than one; and
    (d) means for sequentially positioning said devices in the path of image-bearing radiations by imposing on said devices a reciprocating translatory motion the amplitude of the travel of which is correlated to said ratio.

2. Apparatus as claimed in claim 1, wherein said amplitude of the travel of said translatory motion is substantially proportional to said ratio.

3. Apparatus as claimed in claim 1, wherein said second rate is correlated to a dimension of said devices in a direction of said translatory motion.

4. Apparatus as claimed in claim 1, wherein said means for individually moving each of said devices from a first deflecting position to a second deflecting position are means for angularly moving each of said devices from said first deflecting position to said second deflecting position.

5. Apparatus for controlling the relative position of images formed by laterally confined image-bearing radiations, comprising:
    (a) means including at least two devices for deflecting said image-bearing radiations;
    (b) means for individually moving each of said devices from a first deflecting position to a second deflecting position;
    (c) means for individually returning each of said devices from said second position to said first position at an operatively controlled rate of return; and
    (d) means for sequentially positioning said devices in the path of said image-bearing radiations by imposing on said devices a reciprocating translatory motion the travel of which extends bilaterally beyond lateral confines of said image-bearing radiations by amounts correlated to said controlled rate of mirror return.

6. Apparatus as claimed in claim 5, wherein said means for individually moving each of said devices from a first deflecting position to a second deflecting position are means for angularly moving each of said devices from said first deflecting position to said second deflecting position.

7. A nonintermittent projector for motion picture film bearing information in a series of image frames, comprising:
  (a) means for continuously moving said film through a projection station;
  (b) means for transmitting light through said projection station to provide luminous radiations bearing information contained in image frames on said film;
  (c) means for processing said information-bearing luminous radiations for the formation of corresponding images by optical projection; and
  (d) means compensating for said continuous film motion, including:
    (1) two mirrors;
    (2) means for mounting each of said mirrors in the path of said information-bearing luminous radiations for pivotal movement about an axis extending in parallel to a line which extends through said film substantially at right angles to the direction of said film movement and for reciprocal movement in the direction of said axis;
    (3) means for sequentially imposing said pivotal movement on said mirrors to enable said mirrors to compensate for said continuous film motion sequentially on adjacent image frames;
    (4) means for sequentially returning each mirror from an advanced pivotal position at the end of a compensatory action to an initial pivotal position preparatory to further compensation for said continuous film movement, said mirror returning means being constructed and effective to impose on each of said mirrors an operatively controlled rate of return; and
    (5) means for imposing said reciprocal movement on said mirrors to cause said mirrors to compensate for said continuous film motion sequentially on adjacent image frames, said reciprocal movement means being constructed and effective to extend the reciprocal travel of said mirrors at least by amounts correlated to said controlled rate of mirror return, and each mirror having a mirror surface which is laterally extended at least by an amount of width correlated to said controlled rate of mirror return.

8. A projector as claimed in claim 7, wherein said mirror returning means are constructed and effective to exert operative control over each mirror during at least a portion of its return to said initial pivotal position.

9. A projector as claimed in claim 7, wherein said mirror returning means are constructed and effective to exert operative control over each mirror for the entire duration of its return to said initial pivotal position.

10. A projector as claimed in claim 7, wherein said mirror returning means are constructed and effective to decrease the rate of return of each mirror to realize said controlled rate of return.

11. A projector as claimed in claim 7, wherein said mirror returning means include rate-of-motion-retarding means for realizing said controlled rate of return.

12. A projector as claimed in claim 7, wherein said mirror returning means include means for providing as to each mirror an inertia acting in addition to any inherent inertia and imposing said controlled rate of mirror return.

13. A projector as claimed in claim 7, wherein said mirror mounting means are constructed and effective for mounting said mirrors for individual pivotal movement about a common axis extending in parallel to a line which extends through said film substantially at right angles to the direction of said film movement and for joint reciprocal movement in the direction of said axis.

14. A projector as claimed in claim 13, wherein said mirror mounting means are constructed and effective for mounting said mirrors to have said common axis traverse the mirror surface of each mirror along a line common to said axis and to the mirror surface.

15. A projector as claimed in claim 7, wherein said sequential pivotal mirror moving means and said sequential mirror return means are combined in a common structure.

16. A projector as claimed in claim 15, wherein said common structure includes means defining cam means for sequentially imposing said pivotal mirror movement and cam means for realizing said controlled rate of mirror return.

17. A projector as claimed in claim 16, wherein the first mentioned and the second mentioned cam means include sloped cam surfaces.

18. A projector as claimed in claim 7, wherein said mirror mounting means include guide means for each mirror constructed and effective to guide the mirror for reciprocal movement in the direction of said axis, and means for mounting said guide means for rotational reciprocating movement about said axis.

19. A projector as claimed in claim 18, wherein said guide means include means defining spaced guiding grooves facing said axis.

20. A projector as claimed in claim 7, wherein said means for imposing said reciprocal movement on said mirrors include means for converting a rotational motion into a reciprocally translatory motion.

21. A projector as claimed in claim 7, wherein said luminous radiation processing means include at least one projection lens and said mirror mounting means mount said mirrors in the path of said information-bearing luminous radiations at a location beyond said projection lens as seen from said projection station.

22. A projector as claimed in claim 7, wherein said luminous radiation processing means include a projector objective and said mirror mounting means mount said mirrors in the path of said information-bearing luminous radiations at a location ahead of said projector objective as seen from said projection station.

23. A projector as claimed in claim 7, wherein said means for continuously moving said film include means for varying the speed of said continuous film movement and for selectively adjusting said speed to a rate of less than twelve frames per second.

24. In a nonintermittent motion picture film projector in which two pivotally moved and laterally shuttled mirrors compensate for a continuous film motion in a manner which includes frame changeover operations during which adjacent image frames are projected, and frame display operations wherein a full frame is projected between adjacent frame changeover operations:
  (1) means for extending by predetermined amounts the lateral travel of the mirrors during said shuttle motion;
  (2) means for presenting active mirror surfaces for said mirrors which are laterally extended by predetermined amounts of width; and
  (3) with said predetermined amounts of lateral mirror travel and said predetermined amounts of mirror width being mutually correlated and being dimensioned to have each of said mirrors cause the projection of a full frame between adjacent frame changeover operations for a predetermined duration of time which is at least equal to the duration of one of said frame changeover operations.

25. Apparatus for controlling the relative position of substantially rectangular images having a predetermined aspect ratio, comprising:
  (a) means including at least two devices for deflecting image-bearing radiations, each of said devices having a surface with a substantially rectangular area effective to deflect said image-bearing radiations and having an aspect ratio larger than said predetermined aspect ratio;

(b) means for moving said devices in sequence between extreme deflecting positions; and (c) means for sequentially positioning said devices in the path of image-bearing radiations by imposing on said devices a reciprocating translatory motion the travel of which is such as to subject said area of each of said devices to image-bearing radiations.

References Cited

UNITED STATES PATENTS

| | | | |
|---|---|---|---|
| 1,673,252 | 6/1928 | Kosken | 352—112 X |
| 2,304,558 | 12/1942 | Eisler | 352—112 |

NORTON ANSHER, Primary Examiner

R. A. WINTERCORN, Assistant Examiner

U.S. Cl. X.R.

355—66